(12) United States Patent
Dansachmueller et al.

(10) Patent No.: US 9,111,401 B2
(45) Date of Patent: Aug. 18, 2015

(54) INTERACTIVE READER COMMANDER

(71) Applicant: HID Global GmbH, Walluf (DE)

(72) Inventors: Helmut Dansachmueller, Bad Vilbel (DE); Daniel Halber, Suresnes (FR); Eric Fernand Le Saint, Los Altos, CA (US)

(73) Assignee: HID GLOBAL GMBH (DE)

( * ) Notice: Subject to any disclaimer, the term of this patent is extended or adjusted under 35 U.S.C. 154(b) by 0 days.

(21) Appl. No.: 14/087,926

(22) Filed: Nov. 22, 2013

(65) Prior Publication Data

US 2014/0144985 A1 May 29, 2014

(30) Foreign Application Priority Data

Nov. 29, 2012 (CH) ....................... 2613/12

(51) Int. Cl.
*G06K 5/00* (2006.01)
*G07C 9/00* (2006.01)
*H04L 29/06* (2006.01)
*H04W 12/02* (2009.01)
*H04W 12/06* (2009.01)
*H04W 12/12* (2009.01)
*G06F 21/31* (2013.01)
*G06F 21/54* (2013.01)

(52) U.S. Cl.
CPC .......... *G07C 9/00031* (2013.01); *G06F 21/31* (2013.01); *G06F 21/54* (2013.01); *G07C 9/00944* (2013.01); *H04L 63/0227* (2013.01); *H04W 12/02* (2013.01); *H04W 12/06* (2013.01); *H04W 12/12* (2013.01); *G06F 2221/2113* (2013.01)

(58) Field of Classification Search
CPC ................... G07F 7/08; G07F 7/0813
USPC ................... 235/380, 382, 487, 492
See application file for complete search history.

(56) References Cited

U.S. PATENT DOCUMENTS

| 4,839,640 A | * | 6/1989 | Ozer et al. ............. 340/5.33 |
| 5,406,624 A | | 4/1995 | Tulpan |
| 5,844,497 A | | 12/1998 | Gray |
| 7,775,423 B2 | * | 8/2010 | Fukuda et al. ............ 235/375 |
| 8,523,069 B2 | * | 9/2013 | Hammad et al. .......... 235/384 |
| 2006/0041746 A1 | | 2/2006 | Kirkup et al. |
| 2007/0155500 A1 | | 7/2007 | Honour |

(Continued)

FOREIGN PATENT DOCUMENTS

| EP | 0990971 | 4/2000 |
| WO | WO 93/24906 | 12/1993 |
| WO | WO 98/07092 | 2/1998 |

OTHER PUBLICATIONS

Extended Search Report for European Patent Application No. 13194564.4, dated Apr. 16, 2014 7 pages.

(Continued)

*Primary Examiner* — Daniel St Cyr
(74) *Attorney, Agent, or Firm* — Sheridan Ross P.C.

(57) ABSTRACT

An access control system and a method of operating the same are provided. The access control system includes an interactive reader commander that intercepts commands transmitted from a computing device to a reader and determines if the intercepted commands are security-relevant. Security-relevant commands and possibly other commands are stored unless and until a valid user input is received at the interactive reader commander.

16 Claims, 8 Drawing Sheets

(56) References Cited

U.S. PATENT DOCUMENTS

2008/0288403 A1    11/2008   Von Mueller
2009/0006783 A1*    1/2009   Takemura .................... 711/154
2010/0230490 A1    9/2010   Guthery

OTHER PUBLICATIONS

Search Report for Switzerland Patent Application No. CH02613/12, dated May 6, 2013 2 pages.

* cited by examiner

INTERACTIVE READER COMMANDER

FIELD OF THE DISCLOSURE

The present disclosure is generally directed toward access control systems.

BACKGROUND

Some access control systems employ older or less technically-sophisticated reader devices. Indeed, there is a large installed base of access control readers that are only equipped to read data from an access credential. These readers are sufficient to analyze the authenticity of an access credential (e.g., a thing carried by a user), but they are not natively equipped to verify that it is being carried by an authorized user. More specifically, many readers are not equipped with a keypad, biometric sensor, etc. that enables the reader to confirm the identity of the user in addition to confirming the validity of a credential carried by the user.

Attempts to upgrade these older access control systems propose introducing a Personal Computer (PC) or similar computing device next to the reader. A user is often required to present their access credential to the reader and then enter a password or PIN code into the computing device. The computing device then transfers the user-entered password or PIN code to the reader via a dedicated communication link (often a wired connection). Providing the computing device in combination with the reader increases the level of security because the user that presents the access credential is now also required to prove something they know in addition to proving that they are earring a valid access credential. This is often referred to as dual-factor authentication.

One problem with this upgrade approach is that a keyboard logger or a similar snooping device could be installed to intercept the password/PIN entry process at the computing device or somewhere between the computing device and the reader. This potentially exposes the user's password/PIN to a malicious attacker. Via a replay attack in background at a later stage, an access credential could be abused with the knowledge of the password/PIN retrieved from a previous operation (PIN entry) to perform user-unintended operations (e.g. Signature, Key usage, etc.). As can be appreciated, this exposes the access control system to potential attacks.

Indeed, certain security applications require dual-factor authentication. The best solution from a technical perspective would be to replace every simple reader with a reader that natively includes a keypad so that the user can input their password/PIN directly into the reader. Unfortunately, readers with keypads are very expensive as compared to their simpler counterparts and are often cost-prohibitive to incorporate throughout the entirety of an access control system, especially systems with many readers.

SUMMARY

It is, therefore, one aspect of the present disclosure to provide an improved access control system that overcomes the above-noted shortcomings. Embodiments of the present disclosure propose an intermediate device between a traditional reader (e.g., a reader without a keypad, PIN pad, sophisticated user input, etc.) and a computing device that is configured to receive user input. The intermediate device may be referred to as an Interactive Reader Commander, or IRC. The Interactive Reader Commander can be configured to prevent abuse of a password/PIN gained with a keyboard logger because the Interactive Reader Commander can be configured to block all security relevant commands from the computing device to the reader unless and until a valid input is received from a user at the Interactive Reader Commander. As one example, the valid input may correspond to a user pressing a button on the Interactive Reader Commander. In some embodiments, the Interactive Reader Commander will call for attention (for instance with a blinking light) until all blocked commands have been either validated by the user, or cancelled by removal of the credential. Blocked commands can be validated or cancelled individually or in groups.

For example, this Interactive Reader Commander interprets commands which are sent to the reader and in case of certain commands (e.g. PIN entry) it blocks the command to the reader until the user presses a button on the Interactive Reader Commander. Any other command (e.g. Card Present) passes through the Interactive Reader Commander without user interaction.

The list of commands which are under control of the Interactive Reader Commander can be uploaded to memory and/or firmware of the Interactive Reader Commander, with appropriate security level like digitally-signed codes or after entering a specific password.

In some embodiments, an authentication method is also provided that generally comprises:

receiving, at an interactive reader commander, a command directed from or toward a reader;

determining that the received command corresponds to a sensitive command;

storing the sensitive command at the interactive reader commander; and waiting to receive a user input that validates the sensitive command is to be transmitted further.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
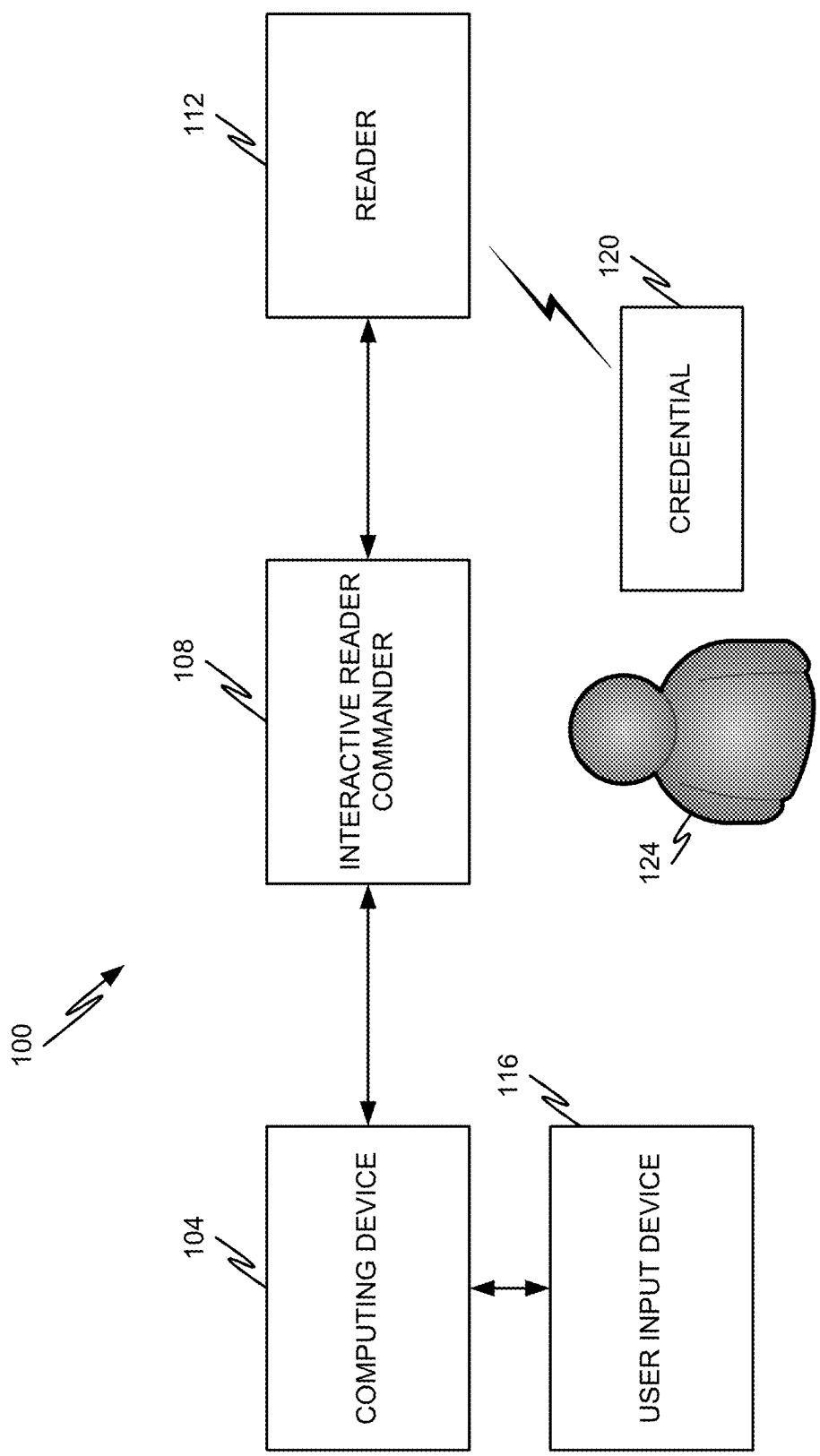
FIG. 1 is a block diagram depicting an access control system in accordance with embodiments of the present disclosure.

Referring initially to FIG. 1, an access control system 100 will be described in accordance with at least some embodiments of the present disclosure. The access control system 100 is depicted as including a computing device 104, an Interactive Reader Commander 108, and a reader 112. The Interactive Reader Commander 108 is provided to control communications between the computing device 104 and reader 112. In some embodiments, the reader 112 is natively configured to read and validate credentials 120 that are carried by a user 124. The reader 112 and credential 120 may exchange data via contact or contactless communication protocols. As a non-limiting example, the credential 120 may correspond to a Radio Frequency Identification (RFID) device and may be configured to exchange data with the reader 112 in accordance with any well known data-communication protocol (e.g., ISO 14443, ISO 15693, Near Field Communications (NFC), Bluetooth, Wi-Fi (e.g., 802.11N, variants thereof, or extensions thereto), GSM, etc.). Alternatively, or in addition, the credential 120 may exchange data with the reader 112 via one or more of optical, magnetic, or acoustic mechanisms. As another non-limiting example, the credential 120 may correspond to a contact-based credential and may either be inserted into a credential acceptor in the reader 112, swiped through a slot in the reader 112, pressed to the reader 112, etc. In general, any type of interface known or yet to be developed that facilitates data communications (secure/encrypted or unsecure/unencrypted) between the reader 112 and credential 120 can be employed.

The credential 120 may assume other form factors than a traditional card-shaped credential. Examples of form factors suitable for the credential 120 include, without limitation, an Integrated Circuit (IC) card, a smart card, a key fob, a passport, a credit card, a debit cart, a PDA, a tag, an NFC-enabled mobile communication device, and the like. The credential 120 is provided as a device that carries evidence of authority, status, rights, and/or entitlement to privileges for a holder or user 124 of the credential 120. As such, a credential 120 is a portable device that is used to complete transactions with a reader 112.

As used herein, the terms "holder" and "user" are used interchangeably in reference to an individual 124 carrying or an identification object, such as credential 120.

The reader 112 may be capable of analyzing data received from the credential 120 and determining whether the credential 120 corresponds to a valid credential 120. As can be appreciated, the reader 112 may perform the validation itself or it may transfer information received from the credential 120 to a host computer or control panel that analyzes the data received from the credential 120 and instructs the reader 112 to perform an action based on its analysis.

In older access control systems, validation of the credential 120 may have been the only validation performed prior to allowing the user 124 access to an asset controlled by the reader 112. Unfortunately, validation of the credential 120 does not necessarily correspond to a validation of the user 124. For example, a thief or malicious user may have stolen a credential 120 from some other user. If this occurred and the reader 112 was only validating the credential 120, then the thief or malicious user would be granted access to the asset protected by the reader 112 simply because the thief or malicious user had possession of the credential 120. Accordingly, increased security is obtained by also requiring the user 124 to prove something they know, such as a password, PIN, etc., and/or something they are, such as via a fingerprint or retina pattern.

In some embodiments, the reader 112 is not natively capable of receiving a complex user input, such as a password, PIN, etc. In particular, the reader 112 may have a relatively simple user input (e.g., single button, flashing light, multiple flashing lights, or the like), but the reader 112 is not natively equipped with a pin pad, key pad, keyboard, or more advanced user input device.

The computing device 104 is provided to enable the second factor of authentication in the access control system 100. In particular, the computing device 104 is equipped with a user input device 116 and the user 124 can provide complex user input to the user input device 116. Examples of user 124 input that may be received at user input device 116 include, without limitation, passwords, PINs, user names, or any other sensitive information that allows the user 124 to prove they know something in addition to carrying a valid credential 120. Suitable user input devices 116 include, without limitation, a keypad, a PIN pad, a QWERTY keyboard, a touch-sensitive display, a fingerprint reader, a retina scanner, an image-capture device, or the like.

The user input device 116 can be a peripheral device to the computing device 104 or it can be integrated into the computing device 104. Suitable examples of a computing device 104 include, without limitation, a Personal Computer (PC), a laptop, a tablet, a cellular phone, a smartphone, a PDA, or any other device having a processor and memory or firmware that enables the computing device 104 to receive data from the user input and transmit the data toward the reader 112. As will be discussed in further detail herein, the data transmitted by the computing device 104 toward the reader may be in the form of a command or instruction to be executed by the reader 112.

The command or instruction transmitted by the computing device 104 toward the reader 112 may correspond to a security-relevant command (e.g., the command may include some or all of the password or PIN entered by the user 124 at the user input device 116). The Interactive Reader Commander 108 is provided to intercept such security-relevant commands and temporarily store them unless and until a valid input is received from the user 124. Only upon receiving a valid input does the Interactive Reader Commander 108 transmit a security-sensitive command along to the reader 112.

Figure 2:
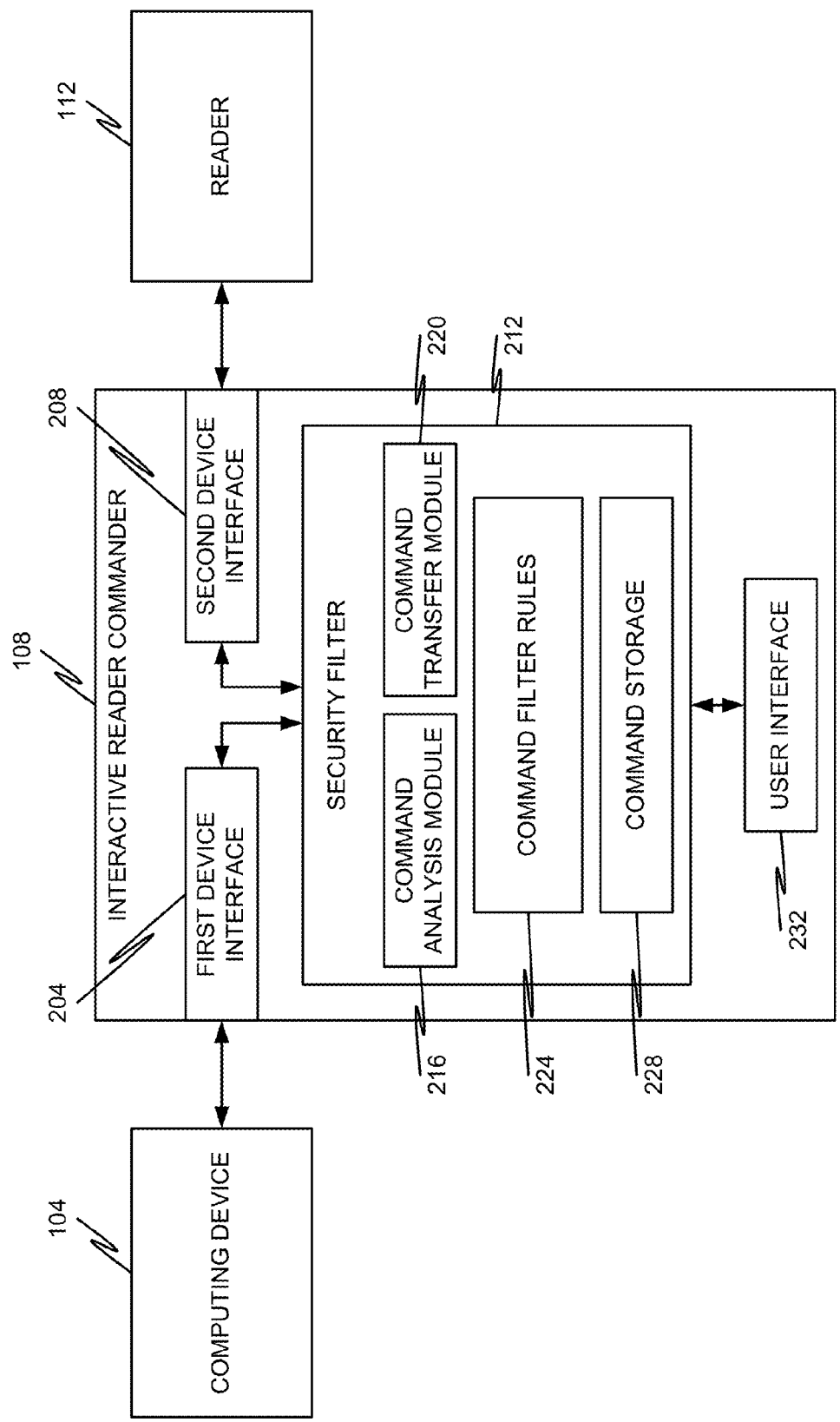
FIG. 2 is a block diagram depicting details of an Interactive Reader Commander in accordance with embodiments of the present disclosure.

With reference now to FIG. 2, additional details of an Interactive Reader Commander 108 will be described in accordance with at least some embodiments of the present disclosure. The Interactive Reader Commander 108 may comprise a first device interface 204 and a second device interface 208. The first device interface 204 may provide both a mechanical and electrical interface that enables the Interactive Reader Commander 108 to communicate with the computing device 104. The first device interface 204 may correspond to any type of communication port or network adaptor, wired or wireless, that facilitates the transfer of messages between the computing device 104 and Interactive Reader Commander 108.

The second device interface 208 may be similar or identical to the first device interface 204, although such a configuration is not necessary. In particular, the second device interface 208 may be configured to exchange data according to protocols available to the reader 112.

Examples of suitable devices or components that may be included in the first or second device interface 204, 208 include, without limitation, a network interface card, a modem, a USB port, a parallel port, a serial port, a Small Computer Systems Interface (SCSI) port, an RS-232 port, a Wiegand port, an Ethernet port, an infrared port, an RF interface, a Bluetooth interface, a cellular communication interface, an 802.11N network interface, drivers, combinations thereof, and/or other wired or wireless communication network interfaces.

As noted above, the Interactive Reader Commander 108 is provided to intercept and analyze commands, instructions, or messages transmitted from the computing device 104 to the reader 112. It should be appreciated, however, that the Interactive Reader Commander 108 may also be configured to perform any of the operations described herein on commands, instructions, or messages transmitted from the reader 112 to the computing device 104.

In some embodiments, the Interactive Reader Commander 108 is provided with a security filter 212 that enables the analysis and processing of messages received at a device interface 204, 208. The security filter 212 may include a command analysis module 216, a command transfer module 220, command filter rules 224, and a command storage area 228. The command analysis module 216 may comprise the logic or instructions that enable the security filter 212 to determine whether a received command corresponds to a security-relevant command or a non-security-relevant command. In particular, the command analysis module 216 may refer to and use the command filter rules 224 when analyzing received commands.

The command filter rules 224, in some embodiments, may comprise logic, algorithm(s), or the like that are executed by the command analysis module 216 to determine whether a received command is a security-relevant command or not. Alternatively, or in addition, the command filter rules 224 may comprise a listing of commands that are expected to be received from the computing device 104 and an indicia as to whether a particular command corresponds to a security-relevant command or not. When a list of commands is included in the command filter rules 224, the list may simply comprise a listing of all security-relevant commands and any command analyzed by the command analysis module 216 not found in the list may be identified as a non-security-relevant command. Alternatively, the list may comprise a listing of non-security-relevant commands and any command analyzed by the command analysis module 216 not found in the list may be identified as a security-relevant command. In some embodiments, the command analysis module 216 or the command filter rules 224 take into account the current command into its context (the previous commands and data exchanged) for a state-full assessment. This context-sensitive analysis allows better detection of trigger commands reducing false negative (for instance, the PIN command may have a different form for different card-edges (e.g., CAC, PIV) or different card interfaces (e.g., contact or contactless)), also reducing false positive (for instance, not blocking a command because in some other context it looks like a PIN command), and deciding whether to store a command following a stored command.

When the command analysis module 216 determines that a received command is not a security-relevant command, the command analysis module 216 may simply pass the command along to the command transfer module 220, which is responsible for transmitting the command along to the reader 112 via the second device interface 208. The command transfer module 220 may simply forward the command along in the same format as it was received at the first device interface 204 or the command transfer module 220 may be configured to re-format the command for transmission to the reader 112 if the communication protocols used by the computing device 104 and reader 112 are not the same or complimentary.

In some embodiments, when the command analysis module 216 determines that a received command is not a security-relevant or sensitive command, the command analysis module 216 does not pass the command along to the command transfer module 220, but instead causes the command to be temporarily stored in the command storage area 228. This is particularly relevant when a previous command was already stored, for instance in the sequence command-1 "send PIN" and command-2 "read data", where command-1 has already been stored, command-2 will fail if it is trying to access PIN-protected data before command-1 has been released from the storage area; command-2 must therefore also be stored if command-1 has already been stored. Conversely, if command-2 was aiming at reading non-PIN protected data, then it may be allowed to pass. Determining whether to store or not command-2 may be difficult, and the context-sensitive analysis introduced above may help.

In some embodiments, the command analysis module 216 may determine that a received security-relevant or sensitive command should pass to the command transfer module 220, in order for instance to implement a IRC-based PIN-caching. PIN-caching means that the user enters the PIN code once and expects the PIN code to be used and reused as many times as necessary for one user-level operation to complete, even if that operation is comprised of many low-level operations, many of them requiring using the same PIN code. To that end, the Interactive Reader Commander 108 may be equipped with a mechanism to enable, configure, or disable the PIN-caching functionality. For instance a tri-position hardware switch may be provided having positions: 0, 1, ∞. This behavior (enabled, cached, disabled) is selected directly on the Interactive Reader Commander 108, for instance via a small "screw" on the bottom of the device. "0": no cache, each PIN is validated. This is the default behavior. "1": After being pressed once, the button will not require being pressed again for the next 1 minute. This 1-minute countdown is reset to zero every time the "screw" changes position (and obviously after one minute since the button was pressed). "∞" (infinity): the button will never require being pressed (disables Interactive Reader Commander 108 main purpose).

When the command analysis module 216 identifies a received command as a security-relevant command, the command analysis module 216 may cause the command to be temporarily stored in the command storage area 228 of the security filter 212. Specifically, the command storage area 228 may comprise any type of known memory device that is large enough to temporarily store between 1 and N, where N is any integer greater than 1, security-relevant commands for a predetermined amount of time, until a valid user input is received at the Interactive Reader Commander 108, or until another event triggers flushing of this memory (e.g., credential removal from the reader 112 has been detected). Examples of memory devices that may be used for the command storage 228 include, without limitation, one or more non-volatile memory cells (e.g., Erasable Programmable Read Only Memory (EPROM) cells or FLASH memory cells, etc.), one or more arrays of dynamic random access memory (DRAM) cells, cache memory, or similar memory devices known in the art. The command storage area 228 may be sized to only store a single command at a time or it may be sized to simultaneously store multiple commands. When sized to store multiple commands, the command storage area 228 may be configured so that the first command into the command storage area 228 is the first command out of the command storage area 228 in response to detecting a valid user input (e.g., as a FIFO buffer).

The security filter 212 may be in communication with a user interface 232 of the Interactive Reader Commander 108. When one or more commands are stored in the command storage area 228, the security filter 212 may monitor activity at the user interface 232 to determine if a valid user input has been received. Only if the security filter 212 detects a valid user input at the user interface 232 will the security filter 212 release the one or more stored commands from the command storage area 228 and pass them to the command transfer module 220 so that they can be forwarded along to the reader 112. Part of the user interface 232, is a mechanism informing the user that user interaction is necessary, for instance a blinking light.

In some embodiments, only a single command may be released from the command storage area 228 in response to receiving a single valid user input. In some embodiments, multiple commands may be released from the command storage area 228 in response to receiving a single valid user input. If multiple commands are stored in the command storage area 228 but less than all of the commands are released from the command storage area in response to receiving a valid user input at the user interface 232, the commands can be released in any order including First In First Out (FIFO), Last In First Out (LIFO), according to logical groupings and not necessarily order of receipt, or the like.

The user interface 232 may be simple or complex. Furthermore, the user interface 232 may comprise a user input, a user output, and/or a combination user input/output. Examples of suitable user inputs for the user interface 232 include, without limitation, one or more display screens, lights, speakers, LEDs, an array of LEDs, and so on. Examples of suitable user inputs that may be used for the user interface 236 include, without limitation, one or more of a keyboard, keypad, button, microphone, etc. Examples of suitable combined user input/output devices include, without limitation, touch-sensitive display devices (e.g., capacitive-sense touch-screens) and the like.

It should be appreciated that the security filter 212 and contents thereof can be implemented as firmware or software. When implemented as software, the various modules 216, 220 and command filter rules 224 may be stored as instructions in memory and the Interactive Reader Commander 108 may further comprise a processor to execute those instructions.

It should also be appreciated that one or more of the components described as being incorporated into the Interactive Reader Commander 108 may be additionally or alternatively incorporated into one or more of the computing device 104, the reader 112, or any other device described herein. More specifically, some or all components of the Interactive Reader Commander 108 can be integrated into a housing (e.g., a plastic shell) that also contains the components of the reader 112. In other words, a common housing may comprise both the Interactive Reader Commander 108 components and the reader 112 components. While these various components may be incorporated into a common housing, they may still maintain a logical separation (e.g., components of the Interactive Reader Commander 108 may be executed on one processor whereas components of the reader 112 may be executed on a different processor). Maintaining this logical separation will allow readers 112 to be manufactured the same as before the introduction of the Interactive Reader Commander 108—thereby avoiding the need to redesign the entirety of the reader 112.

In other embodiments, the entirety of the computing device 104, Interactive Reader Commander 108, reader 112, and user input device 116 may be incorporated into a single device such as a cellular phone, smartphone, tablet, etc. In particular, the reader 112 functionality could be provided as an NFC module contained within the phone. The Interactive Reader Commander 108 could be a separate computing unit from the main computing unit of the phone and the Interactive Reader commander 108 could comprise a hardware-specific button which is accessible on the surface of the phone.

Figure 3:
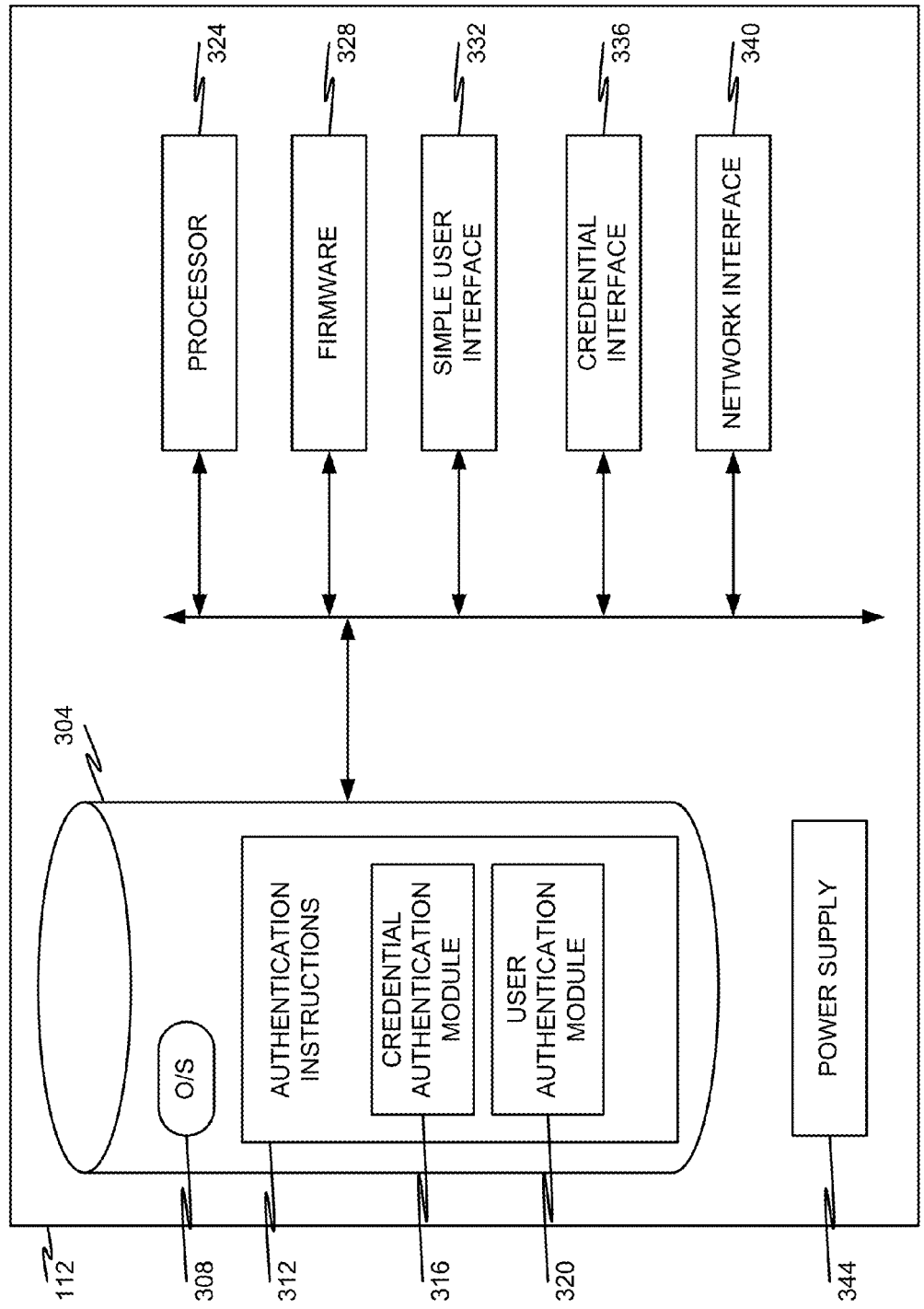
FIG. 3 is a block diagram depicting details of a reader in accordance with embodiments of the present disclosure.

With reference now to FIG. 3, additional details of a reader 112 will be described in accordance with at least some embodiments of the present disclosure. In some embodiments, the reader 112 comprises memory 304, firmware 328, one or more processors 324, a simple user interface 332, a credential interface 336, a network interface 340, and a power supply 344.

The memory 304 generally comprises software routines facilitating, in operation, predetermined functionality of the reader 112. The memory 304 may be implemented using various types of electronic memory generally including at least one array of non-volatile memory cells and/or at least one array of DRAM cells. Some portions of the memory 304 may be pre-programmed and write-protected thereafter, whereas other portions of the memory 304 may selectively be modified or erased. The memory 304 can either be a temporary data storage location or a permanent data storage location. Accordingly, the memory 304 may alternatively, or additionally, include long-term memory devices, such as, a magnetic storage device, a solid-state storage device, an optical storage device, a logic circuit, or any combination of such devices. It should further be appreciated that the programs and data that may be maintained in the memory 304 can comprise software, firmware or hardware logic, depending on the particular implementation of memory 304.

In some embodiments, instructions contained in memory 304 can be implemented or executed by the processor 324. Alternatively, or in addition, various capabilities of the reader 112 may alternatively be implemented in firmware 328.

The processor 324 may include any general-purpose programmable processor, digital signal processor (DSP) or controller for executing application programming. Alternatively, the processor 324 may comprise a specially configured application specific integrated circuit (ASIC). The processor 324 generally functions to run programming code implementing various functions performed by the reader 112.

Some of the applications or sets of instructions that may be stored in memory 304 and/or firmware 328 include an Operating System (O/S) 308 and authentication instructions 312. The O/S 308 may be a high-level application that executes the primary operational functions of the reader 112 such as power-up functions, tamper detection functions, communication functions, and any other function that supports the basic operation of the reader 112.

The authentication instructions 312 are provided to enable the reader 112 to determine analyze and validate credentials 120 presented thereto as well as user inputs received from the computing device 104. The credential authentication module 316 of the authentication instructions 312 may comprise instructions for analyzing data received from a credential 120 and determining whether the credential 120 corresponds to a credential that is recognized as valid and allowed access to an asset protected by the reader 112. The user authentication module 320 of the authentication instructions 312 may comprise instructions for analyzing data received from a user 124 via the computing device 104 and determining whether the user input is valid and/or matches a valid user input associated with the credential 120 that is being presented to the reader 112.

It should be appreciated that some or all of the authentication instructions 312 may be provided on a control panel or host computer that is located remote from the reader 112 and the reader 112 may simply provide credential information and user input information to the control panel/host computer for analysis and validation. The authentication instructions 312 are depicted as being included in the reader 112 only to simplify the description and should not be construed as limiting embodiments of the invention.

The simple user interface 332 may comprise a user input and/or user output. Examples of user outputs that may be included in the simple user interface 332 include one or more lights, speakers, LEDs, an array of LEDs, and so on. Examples of suitable user inputs that may be used for the simple user interface 332 include one or more of a button, microphone, etc.

The credential interface 336 may provide the hardware and drivers that enable the reader 112 to exchange data with the credential 120. The credential interface 336 may enable contact-based and/or contactless communications with credentials 120 in any known fashion. In particular, the credential interface 336 may facilitate the reading of magstripe cards, Wiegand cards, smart cards, proximity cards or prox cards, NFC-enabled communication devices, contact-based smart cards, optical cards, etc.

The network interface 340 may correspond to a device or collection of devices that enable the reader 112 to communicate with the second device interface 208 of the Interactive Reader Commander 108 and/or a control panel/host computer. Accordingly, the network interface 340 may comprise multiple different devices or communication ports. Examples of the network interface 340 include, without limitation, a network interface card, a modem, a USB port, a parallel port, a serial port, a Small Computer Systems Interface (SCSI) port, an RS-232 port, a Wiegand port, an Ethernet port, an infrared port, an RF interface, a cellular communication interface, an 802.11N network interface, and/or other wired or wireless communication network interfaces.

The power supply 344 may comprise an internal source of power (e.g., a battery). Alternatively, or in addition, the power supply 344 may comprise a specially-adapted port along with a power conditioner configured to convert AC power from an external outlet into DC power that is useable by the reader 112. The power supply 344 may further comprise the ability to charge the internal source of power with power from an external source.

Figure 4:
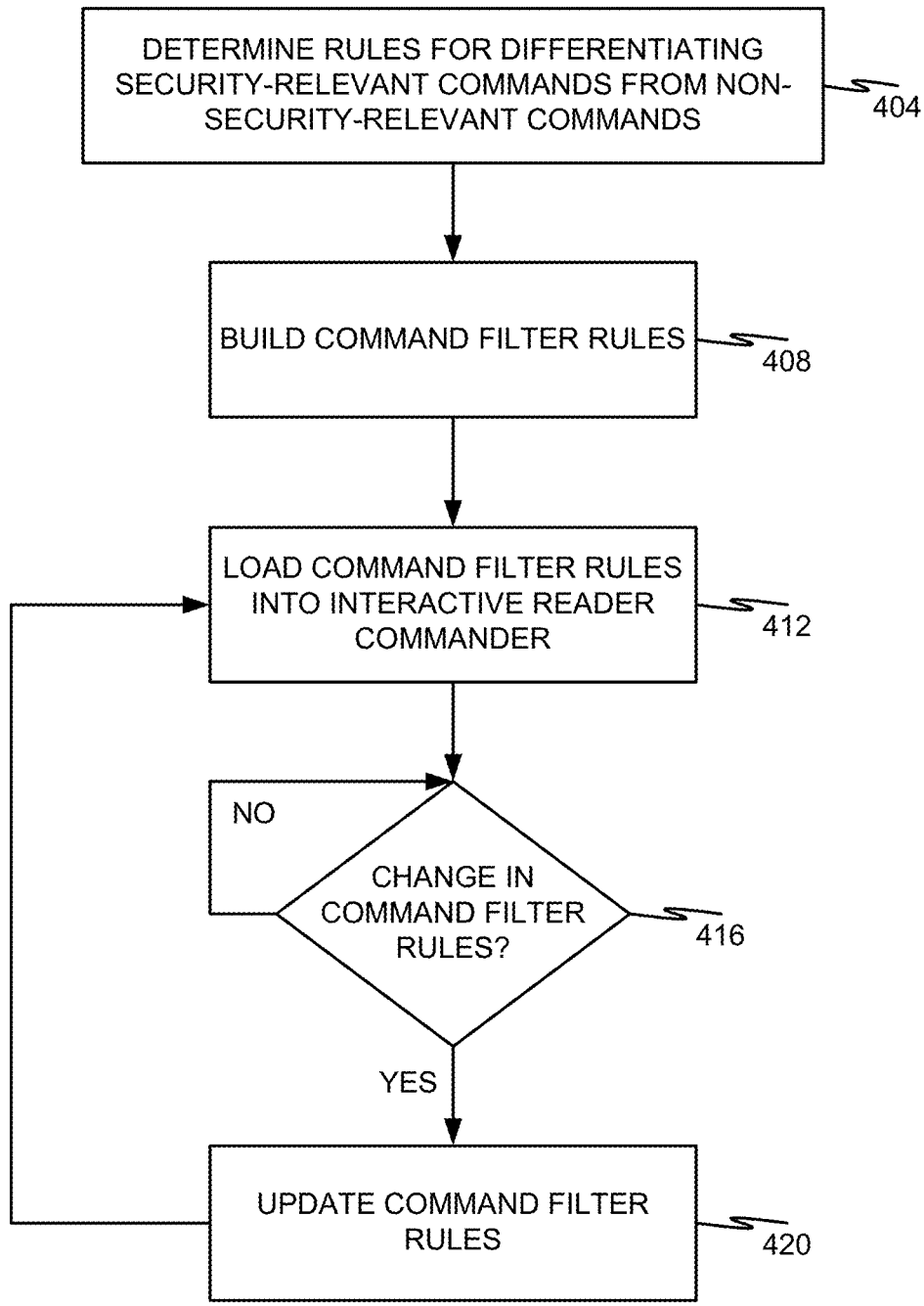
FIG. 4 is a flow diagram depicting a method of building and maintaining command filter rules in accordance with embodiments of the present disclosure.

With reference now to FIG. 4 a method of building and maintaining the command filter rules 224 will be described in accordance with at least some embodiments of the present disclosure. The method begins by determining rules for differentiating security-relevant commands from non-security-relevant commands (step 404). These rules may simply correspond to identifying specific commands that are to be classified as security-relevant (e.g., PIN entry commands, password entry commands, commands such as KeySelect, etc.). The security-relevant commands can be identified by name and/or by characteristics (e.g., any command having one or more user-input values contained therein). Alternatively, or additionally, the rules determined in step 404 may identify specific commands that are to be classified as non-security-relevant (e.g. Card Present or reading other non-security-relevant data). The non-security-relevant commands can also be identified by name and/or by characteristics (e.g., any command not containing user-input values). Alternatively, or additionally, the rules determined in step 404 may correspond to algorithmic steps for analyzing contents of a command (or series of commands for context-aware filtering) to determine whether or not it is a security-relevant command.

Based on the results of step 404, the method continues by building command filter rules 224 (step 408). The command filter rules 224 may then be loaded into the Interactive Reader Commander 108 (step 412). In some embodiments, the command filter rules 224 may be uploaded to the Interactive Reader Commander 108 from a remote location after the Interactive Reader Commander is installed between the computing device 104 and reader 112. In some embodiments, the command filter rules 224 may be uploaded to the Interactive Reader Commander 108 prior to the Interactive Reader Commander 108 being delivered to the customer (e.g., as a manufacturing step). Any other known mechanism for updating device software and/or firmware may be used to upload the command filter rules 224 to the Interactive Reader Commander 108, regardless of whether the Interactive Reader Commander 108 is installed or not.

Once the command filter rules 224 are installed, the Interactive Reader Commander 108 is configured to receive and analyze commands based on the command filter rules 224. Accordingly, security-relevant commands can be differentiated from non-security-relevant commands and be processed accordingly.

The method may continue, however, if it is determined that a change in the command filter rules 224 is required (step 416). This query may be answered affirmatively if a new security-relevant command is to be used, if the reader 112 has been updated, if the computing device 108 has been updated, if an identifier of a command is to be switched from one type to another type (e.g., from security-relevant to non-security-relevant), etc.

If the query of step 416 is answered affirmatively, then the method continues by updating the command filter rules 224 (step 420) and loading the updated command filter rules 224 into the Interactive Reader Commander 108 (step 412). The updated command filter rules 224 may replace the previous version of the command filter rules 224 or be an addition to the command filter rules 224.

Figure 5:
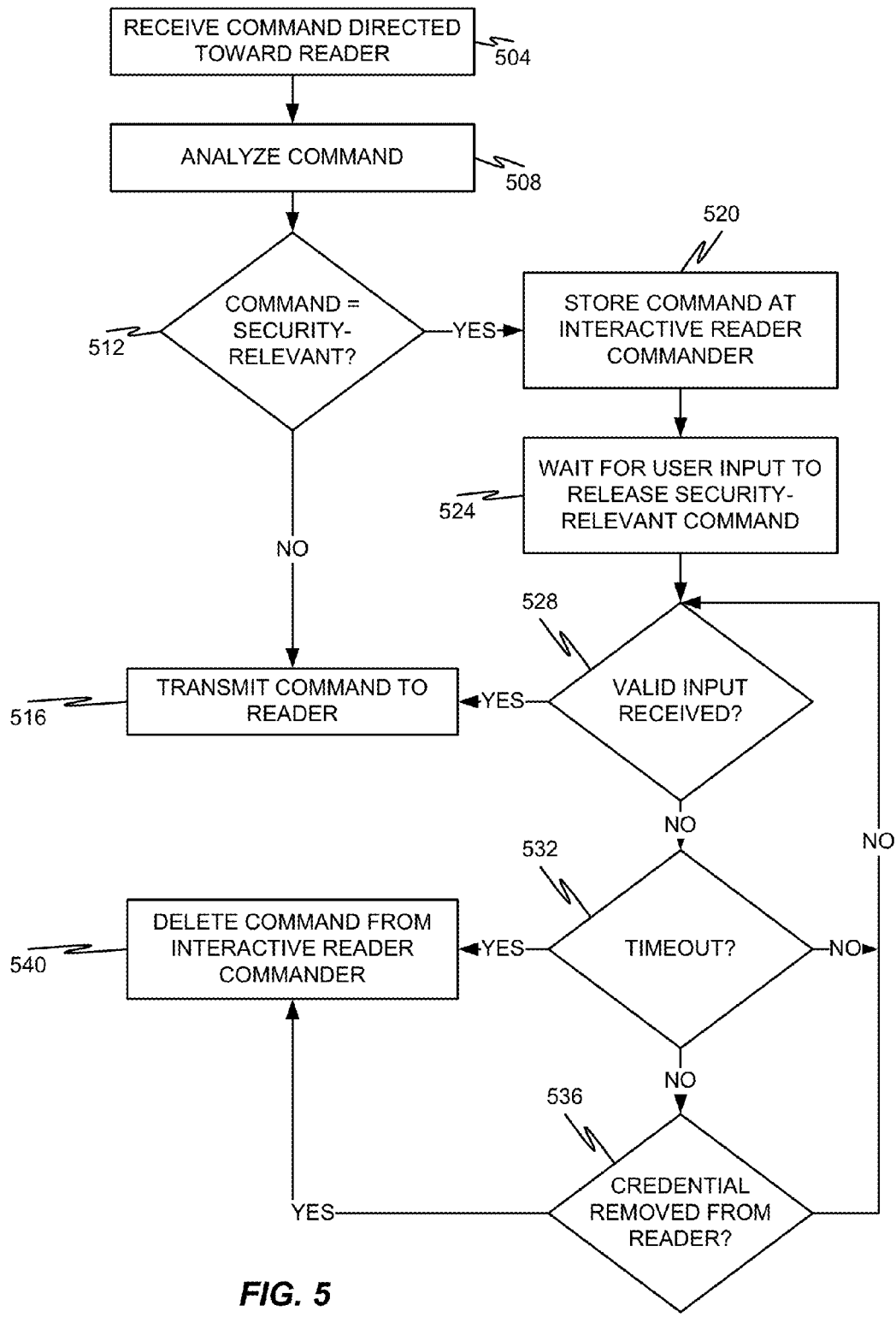
FIG. 5 is a flow diagram depicting a method of processing commands at an Interactive Reader Commander in accordance with embodiments of the present disclosure.
Figure 6:
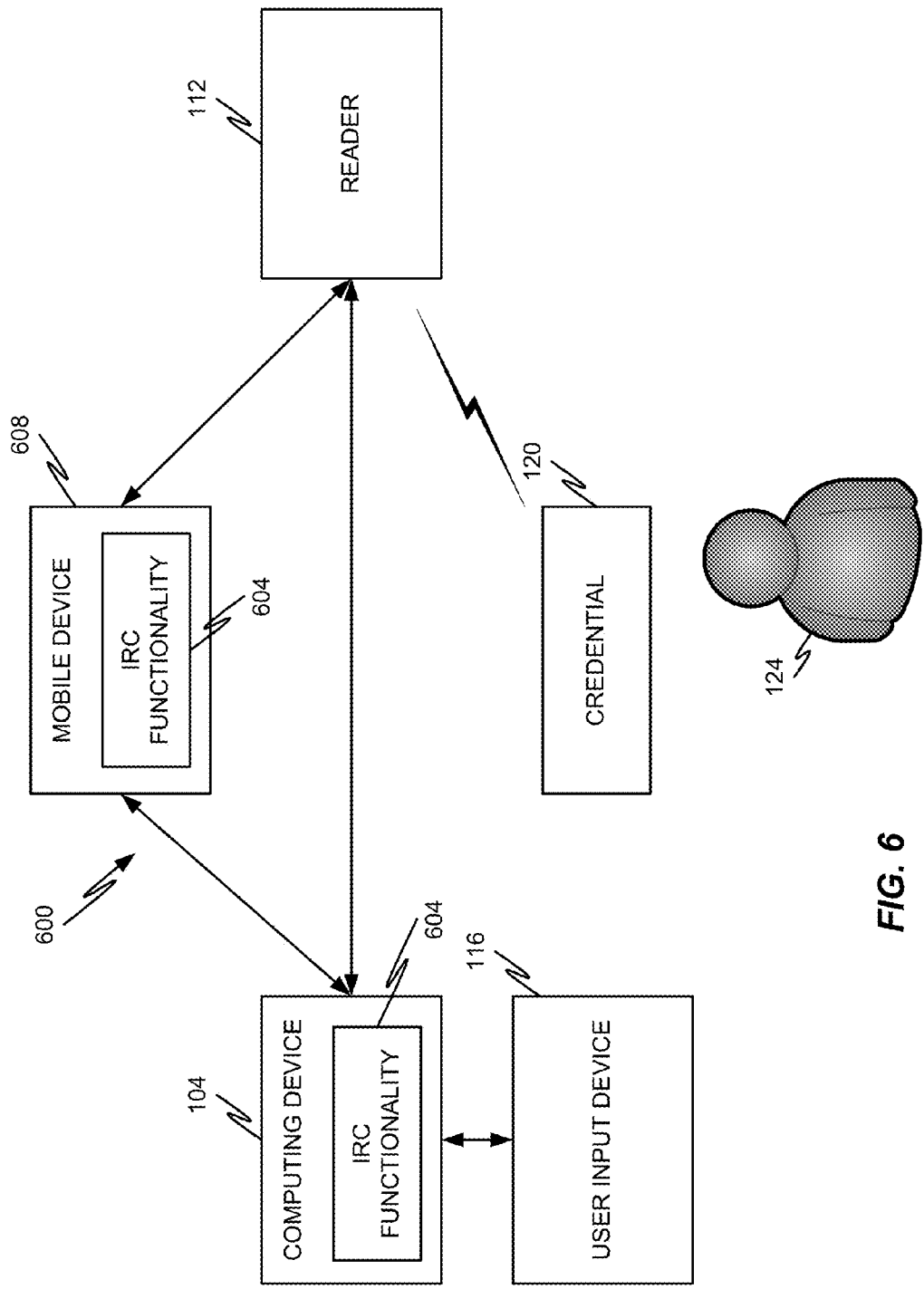
FIG. 6 is a block diagram depicting an access control system in accordance with embodiments of the present disclosure.

With reference now to FIG. 5, a method of processing commands at the Interactive Reader Commander 108 will be described in accordance with at least some embodiments of the present disclosure. Although the processing method described herein will be based on the example of command received from a computing device 104 directed toward the reader 112, it should be appreciated that embodiments of the present disclosure are not so limited and are envisioned to cover commands received from any device directed toward the reader 112 and vice versa. The method begins when a command directed toward the reader 112 is received at the Interactive Reader Commander 108 (step 504). The command may correspond to a command received at the first device interface 204.

The method continues with the security filter 212 invoking the command analysis module 216 to analyze the received command (step 508). In this step, the command analysis module 216 may refer to the command filter rules 224 to identify the type of command that has been received. Based on the analysis of the command and/or the context in which the command was received, the command analysis module 216 determines if the command corresponds to a security-relevant or sensitive command (step 512). If this query is answered negatively, then the command is passed to the command transfer module 220 which prepares the command for transmission to the reader 112 via the second device interface 208 (step 516), unless the command also needs to be stored (for instance when a secondary command depends on the completing of a primary command, which is already stored in the command storage area 228).

Referring back to step 512, if the command is determined to be a security-relevant command or is determined to be received after an already-stored security-relevant command, the command analysis module 216 causes the command to be stored in the command storage area 228 (step 520). The Interactive Reader Commander 108 may also activate a light or some other indicator to communicate to the user 124 that the command entered at the computing device 104 has been stored by the Interactive Reader Commander 108. The security-relevant command will remain in the command storage area 228 while the security filter 212 waits to detect a valid user input at the user interface 232 (step 524). The security filter 212 may be configured to keep the security-relevant command and one or more subsequently received commands in the command storage area 228 until a valid user input is received (step 528) or until a timer has expired (step 532) or until another event triggers flushing of this memory (e.g., credential removal from the reader 112) (step 536).

If a valid user input is received prior to the timer expiring or prior to the memory-flushing trigger occurs, the command transfer module 220 may extract the command(s) from the command storage area 228 and prepare the stored command(s) for transmission to the reader 112 via the second device interface 208 (step 516). If the timer expires before a valid user input is received, the security filter 212 may delete the command(s) from the command storage area 228 (step 540). Other events like credential disconnection from the reader 112 may also initiate deletion of the command(s) from the command storage area 228. Indications of executing either step 516 or 540 may be provided to the user 124 via a user output at the user interface 232.

An alternative arrangement of an access control system 600 will now be described in accordance with at least some embodiments of the present disclosure. In particular, the system 600 is similar to system 100 in that it comprises a computing device 104, a reader 112, a user input device 116, and a credential 120. One way in which the system 600 differs from system 100 is that the reader 112 and computing device 104 may be configured to exchange information with one another without necessarily passing the communications through an Interactive Reader Commander 108.

Another way in which the system 600 differs from system 100 is that some or all functionality of the Interactive Reader Commander 108 may be implemented partially or entirely as IRC functionality 604 in one or both of the computing device 104 or a mobile device 608. In some embodiments, the IRC functionality 604 at either the computing device or the mobile device 608 may be capable of providing, some or all of the functions described above in connection with the Interactive Reader Commander 108. As one example, the IRC functionality 604 may be implemented as software (e.g., instructions stored in memory and executed by a microprocessor).

The IRC functionality 604 may be located in a trusted execution environment and may further be configured to provide a trusted User Interface to a user 124 of the computing device 104 and/or mobile device 608. The trusted execution environment in which the IRC functionality 604 is implemented may be isolated from insecure processes. As some examples, the IRC functionality 604 may be implemented within trusted desktops and/or mobile platform Trusted Execution Environments (TEEs). The TEE, is some embodiments, is a secure area that resides in the main processor of its resident device, such as the mobile device 608, and ensures that sensitive data is stored, processed and protected in a trusted manner. Examples of such environments are further described in U.S. Patent Publication No. 2010/0230490 to Guthery, the entire contents of which are hereby incorporated herein by reference.

The mobile device 608 comprising some or all of the IRC functionality 604 may correspond to a mobile communication device (e.g., cellular phone), smartphone, tablet, laptop, Personal Digital Assistant (PDA), or the like. The mobile device 608 may or may not be configured to exchange communications with the reader 112 and/or computing device 104. More specifically, the mobile device 608 may correspond to an NFC-enabled communication device or a Bluetooth-enabled communication device. The mobile device 608 may utilize one or both of NFC and Bluetooth communication protocols to exchange information with the reader 112. Additionally, the mobile device 608 may be equipped to communicate directly with the computing device 104, either wirelessly or via a wire. Direct wireless communications may be achieved via Bluetooth or NFC, depending upon the capabilities of the mobile device 608 and/or computing device 104. Wireless communications between the mobile device 608 and the computing device 104 may alternatively, or additionally, be achieved over a communication network (e.g., a network at least partially implementing 802.11x standards).

As will be discussed in further detail herein, the IRC functionality 604 may allow one or multiple sensitive transactions/operations to be performed by the user 124, where the transactions/operations require validation of the credential 120 in addition to some form of user input. As one non-limiting example, the IRC functionality 604 may enable the user 124 to use a credential 120, possibly in the form of a PIV card, to repeatedly sign documents, emails, etc. via the computing device 104. The IRC functionality 604 may also enable the user 124 to perform multiple of these transactions/operations with only a single user input and/or single presentation of the credential 120 to the reader 112.

Moreover, to allow a sensitive transaction/operation on the computing device 104 with a secure chip, the user may activate the IRC functionality 604 on the mobile device 608 to produce a One-Time Password (OTP) that can be communicated to the computing device 104. The credential 120 or reader 112 may additionally be provided with keys or the like to verify the OTP that is communicated from the computing device 104 to the reader 112 and/or credential 120. Once the credential 120 and/or reader 112 verifies the mobile OTP, the reader 112 and/or credential 120 may accept commands from the computing device 104 and perform one or more sensitive transactions/operations.

Figure 7:
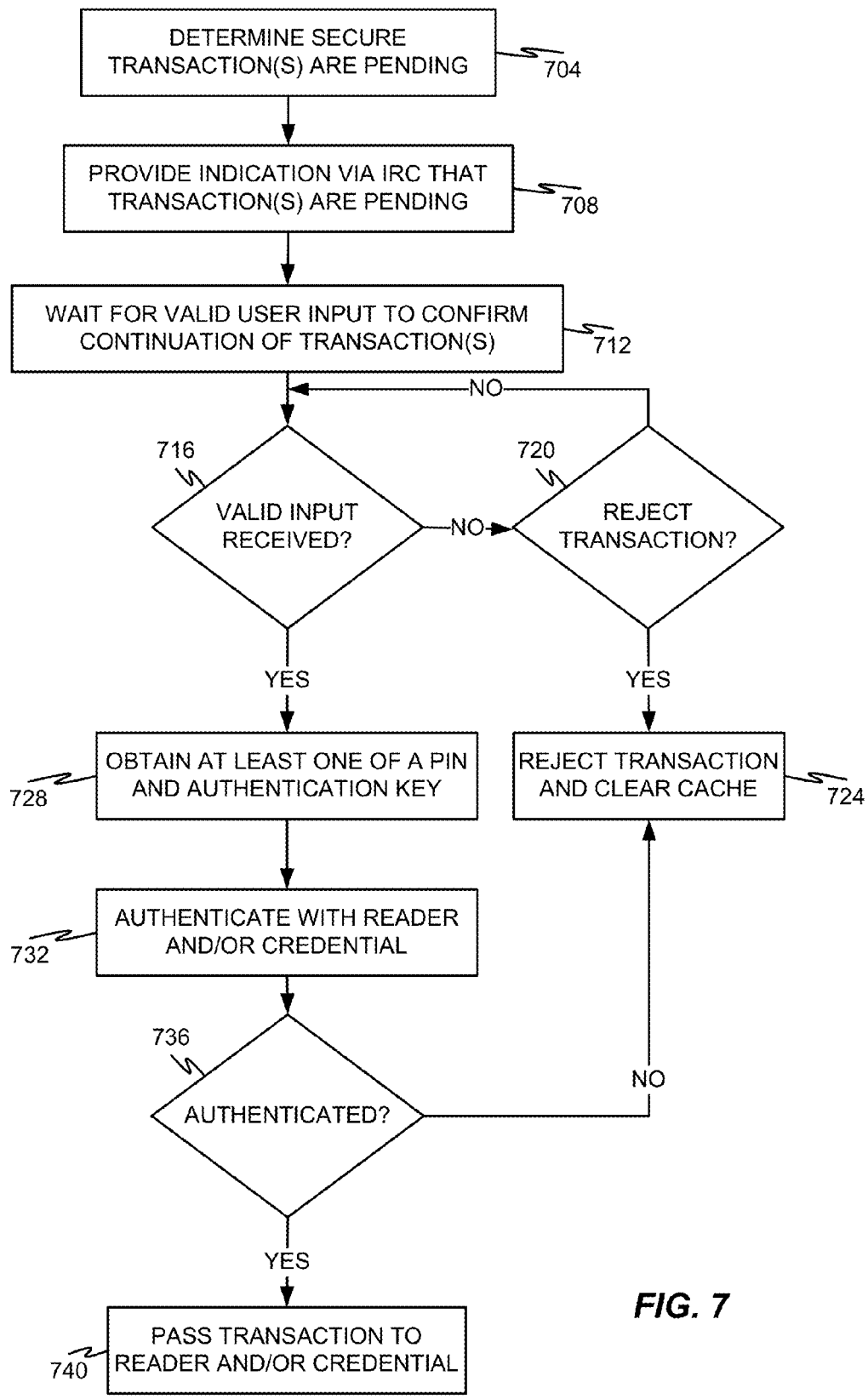
FIG. 7 is a flow diagram depicting a method of performing sensitive operations at a computing device in accordance with embodiments of the present disclosure.

FIG. 7 depicts a method of performing a sensitive transaction that incorporates use of the IRC functionality 604 in accordance with embodiments of the present disclosure. The method begins with the IRC functionality 604 determining that a secure or sensitive transaction is pending (step 704). This determination step may occur when the IRC functionality 604 receives a command or multiple commands from the computing device 104 to the reader 112 and/or credential 120 that corresponds to a command or multiple commands to perform a secure transaction. The command may correspond to a recognized command or the IRC functionality 604 may determine that a secure transaction is pending in response to being activated by the user 124 and in response to generating a OTP for communication to the computing device 104.

The method continues with the IRC functionality 604 providing an indication to the user 124 that one or more transactions are pending (708). This indication may be provided via one or more of audio and visual signals. As one example, the indication may be provided as a pop-up window on either the computing device 108 or mobile device 608. As another example, the indication may be provided by illuminating a button on the computing device 104, Interactive Reader Commander 108, and/or mobile device 608.

After the indication has been provided to the user 124, the method continues with the IRC functionality 604 waiting for a valid user input to confirm the continuation of the transaction(s) (step 712). The valid user input may come simply by having the user 124 press a button or combination of buttons on the computing device 104, Interactive Reader Commander 108, and/or mobile device 108. Alternatively, or additionally, the valid user input may require the user 124 to enter a valid password or PIN.

If no valid input is received after a predetermined amount of time (e.g., no input is received or an invalid input is received) (step 716), then the method continues by determining whether to reject the transaction (step 720). If this query is answered negatively, then the method returns to step 712. If, however, the query of step 720 is answered affirmatively, then the method proceeds by rejecting the transaction and clearing any information that was associated with the transaction or the initiation thereof (step 724).

Referring back to step 716, if a valid input is received, then the method continues with the IRC functionality 604 allowing the command(s) to proceed to the reader 112 and/or credential 120. The reader 112 and/or credential 120 may then obtain at least one of a PIN and authentication key from local memory or from remote memory (step 728) to authenticate the computing device 104 and/or the user 124 that provided the input (step 732). In some embodiments, the PIN and/or authentication key may be retrieved from a secure element that is resident on the mobile device 608 or computing device 104. The secure element from which the PIN and/or authentication key is retrieved may be integrated into the mobile device 608/computing device 104 or removable from the mobile device 608/computing device 104.

The authentication may be performed by the reader 112, the credential 120, or both. If the authentication is successful as determined in step 736, then the transaction information is passed to the reader 112 and/or credential 120 so that the transaction(s) can be processed (step 740). If authentication was not successful, then the method proceeds to step 720 or 724 depending upon whether an additional opportunity for authentication is allowed or not.

Figure 8:
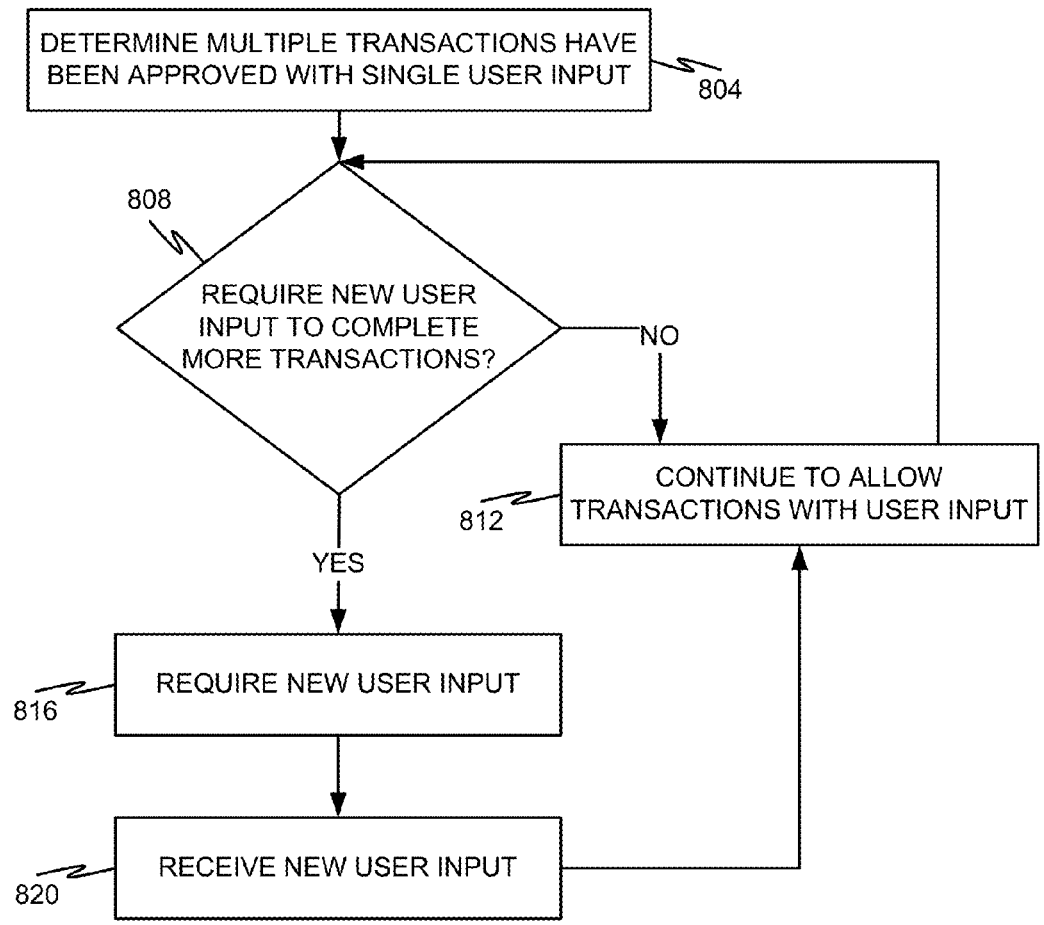
FIG. 8 is a flow diagram depicting a method of enabling multiple transactions with a single user input in accordance with embodiments of the present disclosure.

Referring now to FIG. 8, a method of enabling multiple secure transactions with a single user input will be described. In other words, the disclosed method can be used to control the number of times that a single user input can be used to perform more than one transaction. The method begins by determining that more than one transaction is allowed to be approved with a single user input (step 804). The single user input may correspond to a single pressing of a key on the Interactive Reader Commander 108 and/or IRC functionality 604. Alternatively, or additionally, the single user input may correspond to a PIN or password that was entered by the user 124 at the user input device 116, mobile device 608, or both. This method may be performed in combination with any of the other methods described herein.

Once it has been determined that multiple transactions will be allowed with only a single user input, the method proceeds by allowing the user 124 to perform the multiple transactions. The types of transactions that may be performed include, without limitation, signing electronic documents, signing electronic messages, updating electronic files, etc.

At some point during the processing of one of the transactions, the IRC functionality 604 or the Interactive Reader Commander 108 determines whether new user input is required (step 808). This determination may be based on the number of transactions that have already been processed. For instance, the IRC functionality 604 may limit the number of transactions made with a single user input to N, where N is any integer value greater than or equal to one. It may also be possible to require a new user input after a random number of transactions have occurred (e.g., N equals a randomly-calculated value). As another example, rather than analyzing the number of transactions, a timer value may control the number of transactions that are allowed with a single user input. After the predetermined amount of time has passed since last receiving a user input, the query of step 808 may be answered positively. As yet another example, the behavior of the user 124 may be analyzed to determine whether new user input is required. Specifically, user action at the user input device 116 may be analyzed for certain behavioral patterns. If such patterns are no longer detected, then a new user input may be required. As yet another example, the lack of detected user input at the user input device 116 after a predetermined amount of time may trigger the requirement for a new user input.

If the query of step 808 is answered negatively, then the user is allowed to continue processing more transactions with the single user input (step 812). If, on the other hand, the query of step 808 is answered affirmatively, then new user input is required (step 816) and no further transactions are allowed until a valid user input is received (step 820).

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An access control system, comprising:
   a credential reader configured to exchange data with a computing device;
   an interactive reader commander configured to intercept a command exchanged between the reader and the computing device, determine whether the intercepted command correspond to a sensitive command and, if the intercepted command is determined to correspond to a sensitive command, store the intercepted command in a command storage area unless and until a valid user input is received thereby limiting communication between the credential reader and computing device unless and until a valid user input is received at the interactive reader commander.

2. The system of claim 1, wherein the interactive reader commander is further configured to transmit the sensitive command further only once the valid user input is received.

3. The system of claim 1, wherein the interactive reader commander is further configured to delete the sensitive command from the command storage area if at least one of a timer expires before the valid user input is received and a memory-clearing trigger is detected.

4. The system of claim 1, wherein the interactive reader commander comprises at least two device interfaces and is connected respectively to the reader on one side and to the computing device on the other side.

5. The system of claim 1, wherein the interactive reader commander and the reader are embedded in the same housing.

6. The system of claim 1, wherein the interactive reader commander, the reader and the computing device are embedded in the same housing.

7. The system of claim 1, wherein the computing device includes or is attached to a user input device configured to have a PIN or password entered therein by the user.

8. The system of claim 1, wherein the interactive reader commander comprises command filter rules that are used to determine whether the intercepted command corresponds to a sensitive command.

9. The system of claim 8, wherein the command filter rules comprise at least one of an algorithm used to analyze commands, a list of sensitive commands, and a list of non-sensitive commands.

10. The system of claim 9, wherein the command filter rules comprise context rules configured to determine whether the intercepted command is sensitive based on contents of the intercepted command or based on a command received prior to the intercepted command.

11. The system of claim 1, wherein the interactive reader commander is stored as instructions in memory and is executable by a processor.

12. The system of claim 1, wherein the interactive reader commander comprises an indicator which is activated when a sensitive command is stored at the interactive reader commander.

13. A method, comprising:
   receiving, at an interactive reader commander, a command directed from or toward a reader;
   determining that the received command corresponds to a sensitive command; and
   storing the sensitive command at the interactive reader commander unless and until a user input is received at the interactive reader commander that validates the sensitive command is to be transmitted further, thereby limiting communication between the reader and a computing device unless and until the user input is received at the interactive reader commander.

14. The method of claim 13, further comprising:
   receiving the user input that validates the sensitive command is to be transmitted further;
   retrieving the sensitive command from a command storage area in the interactive reader commander; and
   causing the sensitive command to be transmitted further.

15. The method of claim 13, wherein the determining step includes referring to command filter rules.

16. The method of claim 15, wherein the command filter rules comprise at least one of an algorithm used to analyze commands, a list of sensitive commands, a context analysis algorithm, and a list of non-sensitive commands.

* * * * *